March 12, 1940. K. CORDTS 2,193,508
FUNNEL, PARTICULARLY SUCH AS IS USED IN CONJUNCTION WITH MILK FILTERS
Filed Aug. 21, 1937

KARL CORDTS.
INVENTOR.
BY Ely & Pattison
ATTORNEYS.

Patented Mar. 12, 1940

2,193,508

UNITED STATES PATENT OFFICE 2,193,508

FUNNEL, PARTICULARLY SUCH AS IS USED IN CONJUNCTION WITH MILK FILTERS

Karl Cordts, Eutin, Germany, assignor of one-half to Josefa Gastreich, Cologne-Meerheim, Germany Application August 21, 1937, Serial No. 160,207
In Germany September 24, 1936

3 Claims. (Cl. 210—156)

This invention relates to funnels, particularly such as are used in conjunction with milk filters, embodying a filtering device within the funnel body.

Such filter funnels are required to be simple in construction, foolproof in operation, easily accessible and capable of being readily taken apart, so that they may be easily handled in practice and may comply with the rules of sanitary authorities.

The invention has for its object to improve that type of known filter funnels which embody a filtering device within the funnel body.

According to the invention the filtering device comprises at least one strainer member, a filtering member above said strainer member and at least one further strainer member arranged above the filtering member and provided with a raised border and a raised central part having a centrally arranged upper projection.

Figure 1:
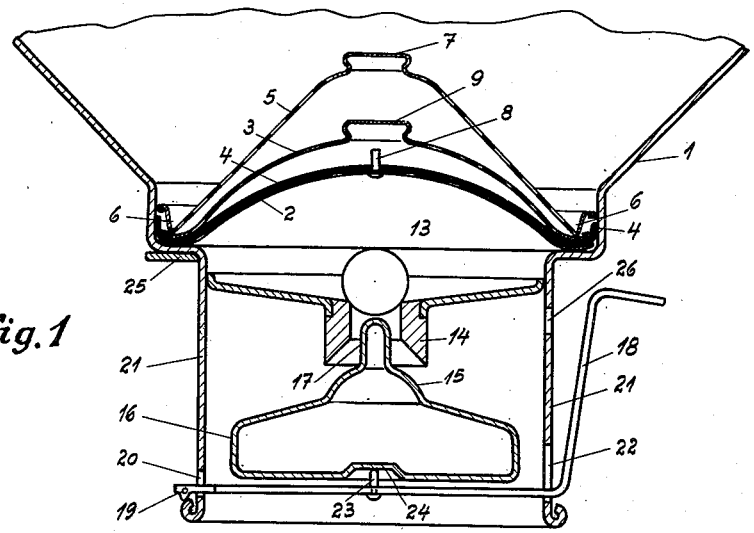
Figure 2:
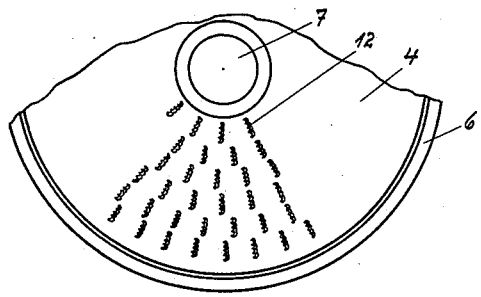
Figure 3:
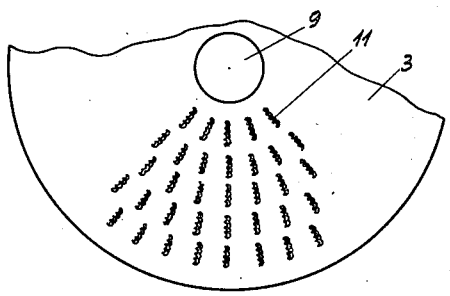
Figure 4:
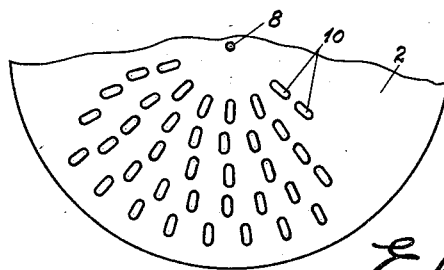

An embodiment of the invention is illustrated by way of example in the accompanying drawing, wherein:

Fig. 1 is a sectional view of a filter funnel, as may be used for example for introducing milk into a container through a filter arrangement mounted in the funnel, with the closure valve means in closing position, Fig. 2 is a plan view of the upper strainer member, Fig. 3 is a plan view of the second strainer member and Fig. 4 is a plan view of the lower strainer member.

Referring to Fig. 1 the funnel comprises a funnel body 1, a filtering device within said body 1 and a closure device below said filtering device. The filtering device comprises two strainer members 2, 3, a filtering member 4 of linen or cotton material between said strainer members 2, 3 and at least one further strainer member 5, arranged above the other strainer members 2, 3 and provided with a raised border 6 and a raised central part having a centrally disposed upper projection 7. Each of the strainer members may also have a raised central part and a centrally disposed upper projection 8 and 9. The strainer members 2, 3, 5 may be held in position by friction between its borders and the funnel body 1 or a tension member like an open ring may be used. The closure device below the filtering device comprises the downwardly acting closure valve member in the form of a ball 13, the valve seat member 14 and the upwardly acting closure valve member 15 formed on the upper side of the float 16. The latter is also provided at its peak with operating means 17 for the downwardly acting valve member 13. 18 is the release bar, formed with a nose 19 at one end which passes through a vertical slot 20 in the neck 21 of the funnel. The other end of the release bar 18 is cranked upwardly and the crank pin portion thereof is adapted to be seated on the upper edge of the container upon which the funnel is placed. At the cranked end the release bar 18 is guided in a slot 23 of the funnel neck 21, so that it shall have a certain amount of vertical movement. Substantially coaxially with the ball 13 and the float 16 the release bar 18 is provided with a projection comprising a pin 24 or the like, said pin co-operating with a depression 25 formed in the bottom of the float 16, the depression being of such size as to allow some lateral play for the pin, the latter preventing undue lateral movement of the float by engagement thereof with the rim portions of the depression. The release bar may be extracted laterally from the funnel neck through the slot 23 by lifting up the nose end 19 thereof so that the nose 19 may pass through the slot 20, the float 16 being also slightly lifted for this purpose. To compensate for the thickness of the crank pin portion of the release bar when the funnel is placed on a container, suitable distance pieces 25 are secured to the base of the funnel body 1 adjacent the upper end of the filter neck 21. Vent holes 26 are provided in the upper part of the funnel neck 21 to allow air to escape. The strainer members 2, 3, 5, shown in the Figs. 2, 3, 4, have slit-like passage-openings 10, 11, 12, the passage openings of the lower strainer member 2 being larger than the corresponding openings in the upper strainer members 3, 5.

Various modifications may be introduced without departing from the spirit of the invention. Thus, the upper strainer member 5 may be used in connection with the filtering member 4 of linen or cotton plate below the strainer member and held in position by a tension member or by placing a perforated plate below the filtering member 4 into the funnel body 1 above the closure device. The strainer members shown in the drawing may have any other suitable shape, f. i. they may have ball-shaped form or partly conical and partly bowed form in vertical cross-section.

The passage openings in the strainer members may also have any suitable shape, f. i. such as circles, ellipses, rectangles, etc. Obviously the funnel with the filtering device may be employed with or without the self-acting closure device.

What I claim is:

1. In a filling funnel particularly for milk filters to be placed upon milk vessels, comprising a funnel body, having an outlet neck, adapted to be inserted in the mouth of the vessel to be filled, a valve seat member, arranged within said outlet neck and having a filling aperture, a filtering device above said valve seat member, having two strainer members, a filtering member between said two strainer members and a further strainer member, arranged above the other strainer members and being provided with a raised border, each strainer member being raised in its central part and having a centrally positioned and upwardly directed extension, said extension of said lowermost strainer member consisting in a stem adapted to center said filtering member and a downwardly acting gravity controlled closure valve member in cooperative connection with said valve seat member and means for lifting said closure valve member when the funnel is placed upon the vessel.

2. In a filling funnel particularly for milk filters to be placed upon milk vessels comprising a funnel body, having an outlet neck, adapted to be inserted on the mouth of the vessel to be filled, a valve seat member, arranged within said outlet neck and having a filling aperture, a filtering device above said valve seat member, having two strainer members, a filtering member between said two strainer members and a further strainer member arranged above the other strainer members and being provided with a raised border, each strainer member, being raised in its central part and having a centrally positioned and upwardly directed extension and a downwardly acting gravity controlled closure valve member, disposed between said filtering device and said valve seat member and in cooperation with said valve seat member and means for lifting said closure valve member when the funnel is placed upon the vessel, comprising a float, disposed within said outlet neck, having means to operate said closure valve member, lateral recesses in said outlet neck, and a displaceable release bar guided in said recesses and carrying said float being adapted to cooperate with the mouth of the vessel to be filled when the funnel is placed thereon.

3. In a filling funnel particularly for milk filters to be placed upon milk vessels, comprising a funnel body, having an outlet neck, adapted to be inserted in the mouth of the vessel to be filled, a valve seat member arranged within said outlet neck and having a filling aperture, a filtering device above said valve seat member, having two strainer members, a filtering member between said two strainer members and a further strainer member arranged above the other strainer members and being provided with a raised border, each strainer member being raised in its central part and having a centrally positioned and upwardly directed extension, a downwardly acting gravity controlled closure valve member and an upwardly acting closure valve member in cooperative connection with said valve seat member, a float disposed within said outlet neck carrying said upwardly acting closure valve member and having means to operate said gravity controlled closure valve member, lateral recesses in said outlet neck, a displaceable release bar guided in said recesses and carrying said float being adapted to cooperate with the mouth of the vessel to be filled when the funnel is placed in operative position thereon.

KARL CORDTS.